(12) United States Patent
Stark et al.

(10) Patent No.: US 10,939,434 B2
(45) Date of Patent: Mar. 2, 2021

(54) ENHANCED FREQUENCY SELECTION

(71) Applicant: NOKIA SOLUTIONS AND NETWORKS OY, Espoo (FI)

(72) Inventors: Thomas Stark, Munich (DE); Patrycja Bukowiecka, Wroclaw (PL); Birger Haetty, Munich (DE)

(73) Assignee: NOKIA SOLUTIONS AND NETWORKS OY, Espoo (FI)

(*) Notice: Subject to any disclaimer, the term of this patent is extended or adjusted under 35 U.S.C. 154(b) by 703 days.

(21) Appl. No.: 15/093,253

(22) Filed: Apr. 7, 2016

(65) Prior Publication Data

US 2017/0295574 A1    Oct. 12, 2017

(51) Int. Cl.
| | |
|---|---|
| *H04W 72/04* | (2009.01) |
| *H04W 24/10* | (2009.01) |
| *H04W 24/08* | (2009.01) |
| *H04W 72/10* | (2009.01) |

(52) U.S. Cl.
CPC ....... *H04W 72/0453* (2013.01); *H04W 24/08* (2013.01); *H04W 24/10* (2013.01); *H04W 72/042* (2013.01); *H04W 72/10* (2013.01)

(58) Field of Classification Search
CPC .... H04W 72/0453; H04L 45/00; G01N 29/14
See application file for complete search history.

(56) References Cited

U.S. PATENT DOCUMENTS

| | | | |
|---|---|---|---|
| 4,760,329 A * | 7/1988 | Andreano | G01R 31/31908 714/32 |
| 9,008,046 B2 | 4/2015 | Jung et al. | |
| 2005/0216227 A1 * | 9/2005 | Warrior | H04L 45/00 702/181 |
| 2007/0026810 A1 | 2/2007 | Love et al. | |
| 2009/0075596 A1 | 3/2009 | Gorokhov et al. | |
| 2013/0217398 A1 | 8/2013 | Winiecki et al. | |

(Continued)

FOREIGN PATENT DOCUMENTS

| | | |
|---|---|---|
| CN | 101690292 A | 3/2010 |
| CN | 102457857 A | 5/2012 |

(Continued)

OTHER PUBLICATIONS

European Search Report issued in corresponding European Patent Application No. 17164878.5 dated Sep. 1, 2017.

(Continued)

*Primary Examiner* — Myron Wyche

(74) *Attorney, Agent, or Firm* — Squire Patton Boggs (US) LLP

(57) ABSTRACT

Various communication systems may benefit from appropriate selection of frequencies for measurement purposes. For example, certain wireless communication systems that can use numerous frequencies but measure a smaller number of frequencies, may benefit from enhanced frequency selection. A method can include identifying a set of possible frequencies for measurement by a user equipment. The method can also include selecting a subset of frequencies from the possible frequencies based on parameters configured by an operator. The method can additionally include causing communication of the selection to the user equipment in a list.

20 Claims, 11 Drawing Sheets

(56) References Cited

U.S. PATENT DOCUMENTS

2014/0298912 A1* 10/2014 Larkin .................. G01N 29/14
　　　　　　　　　　　　　　　　　　　　73/658
2015/0017999 A1　　1/2015 Chen et al.
2015/0327286 A1　 11/2015 Yiu et al.
2016/0269919 A1* 9/2016 Kazmi .............. H04W 36/0094

FOREIGN PATENT DOCUMENTS

WO　　WO 2009/047740 A2　4/2009
WO　　　　2015/047180 A1　4/2015
WO　　　　2015/047180 A1　11/2019

OTHER PUBLICATIONS

Chinese Office Action issued in corresponding Chinese Patent Application No. 201710361780.6 dated Nov. 1, 2019.

* cited by examiner

| serving cell viewpoint | frequency configured | known cells | used cells | weight |
|---|---|---|---|---|
| frequency 2 | 1 | 2 | 2 | 13 |
| frequency 3 | 1 | 2 | 3 | 3 |
| frequency 4 | 1 | 0 | 0 | 1 |

Figure 10

ENHANCED FREQUENCY SELECTION

BACKGROUND

Field

Various communication systems may benefit from appropriate selection of frequencies for measurement purposes. For example, certain wireless communication systems that can use numerous frequencies but measure a smaller number of frequencies, may benefit from enhanced frequency selection.

Description of the Related Art

In mobile communication networks a base station (BS) and user equipment (UE) can connect via a radio interface. One parameter of the radio interface is the frequency band that is used for the data transmission. Usually more than one frequency band is available. In most mobile communication standards, such as LTE, WCDMA, GSM, or the like, the base station selects the frequency band to be used.

In order to optimize the connection and overall system performance, the base station can consider two kinds of measurements. On one hand, the base station can measure signal strength and quality of the signal received from the user equipment. On the other hand, the base station can order certain measurement results from the user equipment. These ordered measurements can provide power and quality information of the signal received by the user equipment from the base station or other base stations or similar devices.

As the measurement capability of the user equipment is limited, the base station may have to restrict the number of measurements that are asked from the user equipment. When there are more frequency bands available than the user equipment can measure at a time, the base station may have to select the frequency bands to address performance of the connection and of the overall network.

SUMMARY

According to certain embodiments, a method can include identifying a set of possible frequencies for measurement by a user equipment. The method can also include selecting a subset of frequencies from the possible frequencies based on parameters configured by an operator. The method can additionally include causing communication of the selection to the user equipment in a list.

In certain embodiments, an apparatus can include at least one processor and at least one memory including computer program code. The at least one memory and the computer program code can be configured to, with the at least one processor cause the apparatus at least to identify a set of possible frequencies for measurement by a user equipment. The at least one memory and the computer program code can also be configured to, with the at least one processor cause the apparatus at least to select a subset of frequencies from the possible frequencies based on parameters configured by an operator. The at least one memory and the computer program code can further be configured to, with the at least one processor cause the apparatus at least to cause communication of the selection to the user equipment in a list.

An apparatus, according to certain embodiments, can include means for identifying a set of possible frequencies for measurement by a user equipment. The apparatus can also include means for selecting a subset of frequencies from the possible frequencies based on parameters configured by an operator. The apparatus can additionally include means for causing communication of the selection to the user equipment in a list.

A method, in certain embodiments, can include grouping available frequencies for measurement by a user equipment into a plurality of groups. The method can also include configuring parameters to an access node for selecting frequencies for measurement based on groups.

According to certain embodiments, an apparatus can include at least one processor and at least one memory including computer program code. The at least one memory and the computer program code can be configured to, with the at least one processor cause the apparatus at least to group available frequencies for measurement by a user equipment into a plurality of groups. The at least one memory and the computer program code can also be configured to, with the at least one processor cause the apparatus at least to configure parameters to an access node for selecting frequencies for measurement based on groups.

In certain embodiments, an apparatus can include means for grouping available frequencies for measurement by a user equipment into a plurality of groups. The apparatus can also include means for configuring parameters to an access node for selecting frequencies for measurement based on groups.

A computer program produce can, in certain embodiments, encode instructions for performing a process. The process can include any of the above-described methods.

A non-transitory computer-readable medium can, according to certain embodiments, be encoded with instructions that, when executed in hardware, perform a process. The process can include any of the above-described methods.

BRIEF DESCRIPTION OF THE DRAWINGS

For proper understanding of the invention, reference should be made to the accompanying drawings, wherein:

FIG. 10 illustrates an example of a weighted probability randomization, according to certain embodiments.

DETAILED DESCRIPTION

In a network there may be n frequency bands available. The base station can order measurement reports from the user equipment related to frequency bands. The user equipment can be configured to perform measurements for m frequency bands at a time, where m is less than n. Thus, the base station can select m out of n frequency bands. The base station can take into account any or all available information about radio coverage of the other frequency bands in the own radio cell area. The operator can configure the selection algorithm. For example, the configuration of the selection algorithm can give preference to certain frequency bands or groups of frequency bands. The operator can also configure the frequency selection method per group of frequency bands.

Thus, certain embodiments provide a way for an operator to define a group of frequencies, for example as a first list, that always appear in an inter frequency measurement configuration. All other configured frequencies can appear in the inter frequency measurement configuration according to, for example, a weighted probability randomization algorithm.

Certain embodiments likewise permit an operator to define different groups of configured frequencies. The order of these groups in the inter frequency measurement configuration can be according to a configurable group priority. The selection of the frequencies belonging to one group can be done according to an operator configurable algorithm.

Figure 1:
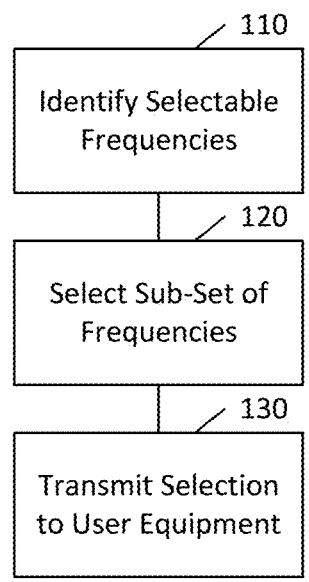
FIG. 1 illustrates a method according to certain embodiments.

FIG. 1 illustrates a method according to certain embodiments. As shown in FIG. 1, the method can include, at 110, identifying a set of selectable frequencies. The method can also include, at 120, selecting a sub-set of frequencies from the set of selectable frequencies. The method can further include, at 130, identifying the selected sub-set to a user equipment, such as by transmitting a list of the frequencies to be measured by the user equipment.

Figure 2:
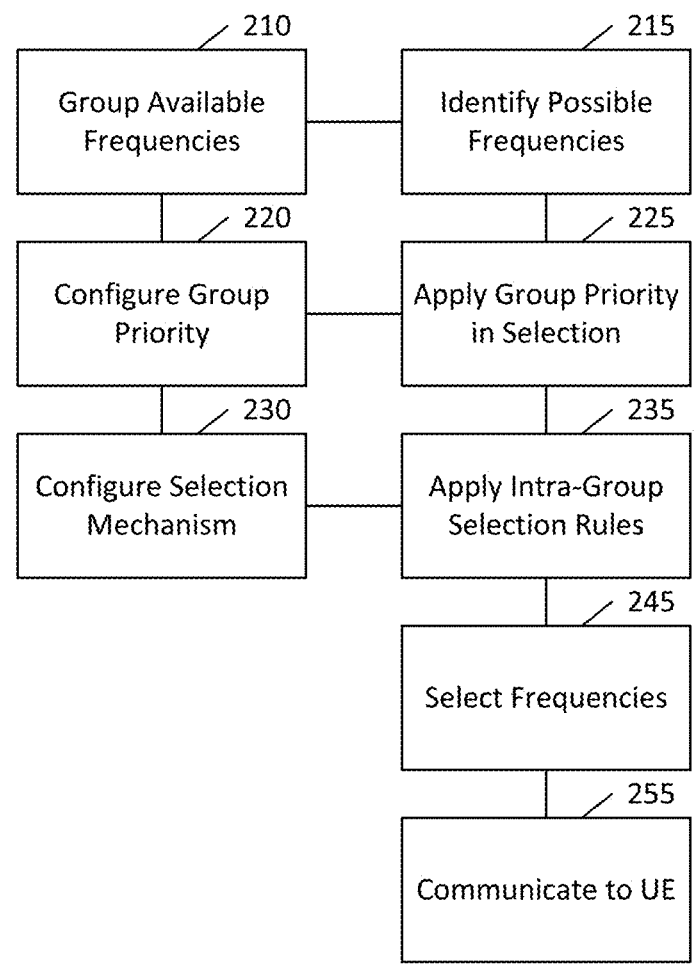
FIG. 2 illustrates a further method according to certain embodiments.

FIG. 2 illustrates a further method according to certain embodiments. As shown in FIG. 2, in certain embodiments, a two stage ordering and selection method can be used. At 210, all available frequencies are grouped. The position of the group members in the final list can depend on a configurable group priority, which can be configured at 220 and applied at 225. The selection mechanism and order of frequencies within one group can be determined by a configurable selection mechanism, which can be configured at 230 and applied at 235. Options for the selection mechanism can include, for example, fixed order within group, equal priority random selection, and weighted priority random selection. The selected frequencies can be communicated to a user equipment at 255.

Frequency groups can be defined to contain one or more frequencies, and the definition can be operator configurable. A group can have a group profile.

The group profile can include several information elements. For example, the group profile can include a group priority that determines a position of the group's frequencies in the final frequency list. The group profile can also include a group size that determines the number of reserved places for frequencies of this group in the final frequency list. Furthermore, the group profile can include identification of a frequency selection method that determines how the frequencies of this group are selected.

The selection methods can include any of the following, in any combination: fixed order within group, in which frequencies are selected in the order of their configurable frequency priority, which can be unique per frequency group; equal priority random selection, in which frequencies are selected from the group randomly and where the probability to become selected is equal for all frequencies in the group; or weighted probability random selection in which frequencies are selected from the group randomly; the probability to become selected may depend on the weight of the frequency and the weight can be determined dynamically according to the actual neighbor relationship between the serving cell and cells of the frequency or by any other desired mechanism.

The method can include, at 245, selecting m out of n frequency bands, where m≤n, for UE measurements by setting/receiving parameters, by the operator/eNode, for the eNodeB to control the frequency selection. The n frequency bands may be those frequencies identified as possibly measurable after performing legacy filtering as discussed below. Thus, the method can also include, at 215, identifying possible frequencies, which may be a subset or the full set of the grouped available frequencies.

In a case where m is equal to n, the selection mechanism may not need to reduce the number of frequencies, but may be involved in the ordering of the frequencies. Thus, certain embodiments are applicable not only when m is less than n, but also when m is equal to n.

The parameters can include a group profile. The group profile can include a group priority that determines position of the group's frequencies in the final frequency list. The group profile can also include a group size that determines the number of reserved places for frequencies of this group in the final frequency list. The group profile can additionally include a frequency selection method that determines how the frequencies of this groups are selected The frequency selection method can include one of the following: fixed order within group, in which frequencies are selected in the order of their configurable frequency priority, which can be unique per frequency group; equal priority random selection, in which frequencies are selected from the group randomly; or weighted probability random selection, in which the weight is determined dynamically according to, for example, an actual neighbor relationship between the serving cell and cells of the frequency.

A two stage approach can serve the requirements from operators that own multiple (e.g. LTE) frequencies and have self-organizing network (SON) requirements as well. For example, for passive automatic neighbor relation (ANR) one place in the final frequency list can be reserved per group definition for frequencies without neighbor relationships.

Various use cases are possible. For example, there can be a definition of a highest priority first list containing the frequencies with coverage preferred by an operator, such as coverage with the most area or most covered subscribers to the operator's services. Another example can be definition of a frequency group for home eNodeB frequencies in order to let the UE always deliver measurements for these frequencies first, if frequencies have coverage at the UE location. A further example can be definition of a group for small cell frequencies. An additional example can be definition of a group for carrier aggregation supporting frequencies. Other similar group definitions are also permitted. All of these group definitions can be selected based on, for example, operator requirements.

The operator can optionally provide a listing of frequencies in association with a particular list having a particular priority. Alternatively, the operator could define criteria by which the eNodeB or other access node could dynamically associate a particular frequency with a highest priority list.

In certain embodiments, for example, the operator can specifically identify a set of frequencies that are considered to have a highest priority. These may be the frequencies that the operator would like to prefer over other frequencies, for any reason that the operator has, such as economic reasons, regulatory reasons, or system operational reasons.

In certain embodiments, the operator can also assign a group size, which may dictate how many places in the final frequency list are filled with frequencies from a corresponding group, including the highest priority group. Thus, if the group size is p, then p frequencies from the highest priority list will occupy the frequency list before gap filling occurs, assuming that there are at least p frequencies available to be included in the list. As will be explained, a gap filling procedure may increase the number of frequencies from the highest priority group in a final frequency list.

There are various procedures defined in LTE and other standards to allow the eNodeB or other access node to configure a UE or similar device to perform certain measurements and report the results. These procedures can be used, for example, for normal mobility management, traffic steering, and the like. Thus, for example, a UE can measure neighbor cells' radio strength and quality and report the results. Those neighbor cells can operate on the same frequency as the serving cell or on different frequencies.

In the latter case, the eNodeB can configure a limited amount n of neighbor frequencies and related parameters in the UE. However, mobile network operators may own more frequencies, such as n owned frequencies. Thus, n may be greater than m. Certain embodiments permit the operator to set parameters for the eNodeB or other access node to control frequency selection of up to n frequencies in multiple ways. The (sub-)grouping of frequencies and the different selection methods within the (sub-)groups can address a variety of use cases, such as those discussed above.

Certain embodiments may implement such groupings using a defined group profile including various parameters. One of the parameters may be a selection method that is used within a group, as mentioned above.

In addition to mobility management and traffic steering, the frequency selection mechanism described herein may also be used for frequencies to be checked by a user equipment for carrier aggregation (CA) purposes. In such a case, as will be described below, a CA application filter may initially be used to provide a starting set of frequencies from which n frequencies may be selected on the basis of group profile(s) and so on.

There can also be other selections that can take place after the selection of frequencies from which measurements are to be taken. For example, cells can select which measurement reports to share with other cells.

Furthermore, once the user equipment receives the list of frequencies to be measured, the user equipment may make a selection based on that list of frequencies. The details of how the user equipment makes use of the list, however, can be an additional aspect. For example, in some future implementation the user equipment may receive a list of n frequencies to measure and may be capable of measuring more than n, perhaps because the base station is operating according to an older standard. In such a case, the user equipment may make selections from the list, for example, to measure one or more of the frequencies more than once.

A UE may measure all frequencies more than once. Optionally, a UE might do measurements in an order that is determined by any mechanism at the UE, such as based on history information or the like. Thus, in certain embodiments it may not be guaranteed that the UE does the measurements in the order used in the configuration message. Alternatively, the UE may be configured to simply apply the frequencies in the order indicated in the list.

In certain embodiments, frequencies identified by a network entity to the base station can be identified by two attributes or parameters. A first attribute or parameter can be frequency group. The frequency group can be a specific number, such as a number from 1 to 11. No group assignment indicated can mean a default group, which can be group priority 12, where the other groups are from 1 to 11.

A second attribute or parameter can be frequency priority within the group. No frequency priority may be needed if the selection method is not fixed order within group.

As will be discussed below, a given group can get from 0 to n of n places in a final frequency list, in accordance with a group profile.

A final frequency list can contain a first frequency group with highest priority, then successive groups down to, for example group 12. This order can be according to group priority, not randomized.

Other legacy filters, such as UE capabilities, service dependency, and the like, can be kept unchanged and applied before the frequency selection being discussed herein.

Figure 3:
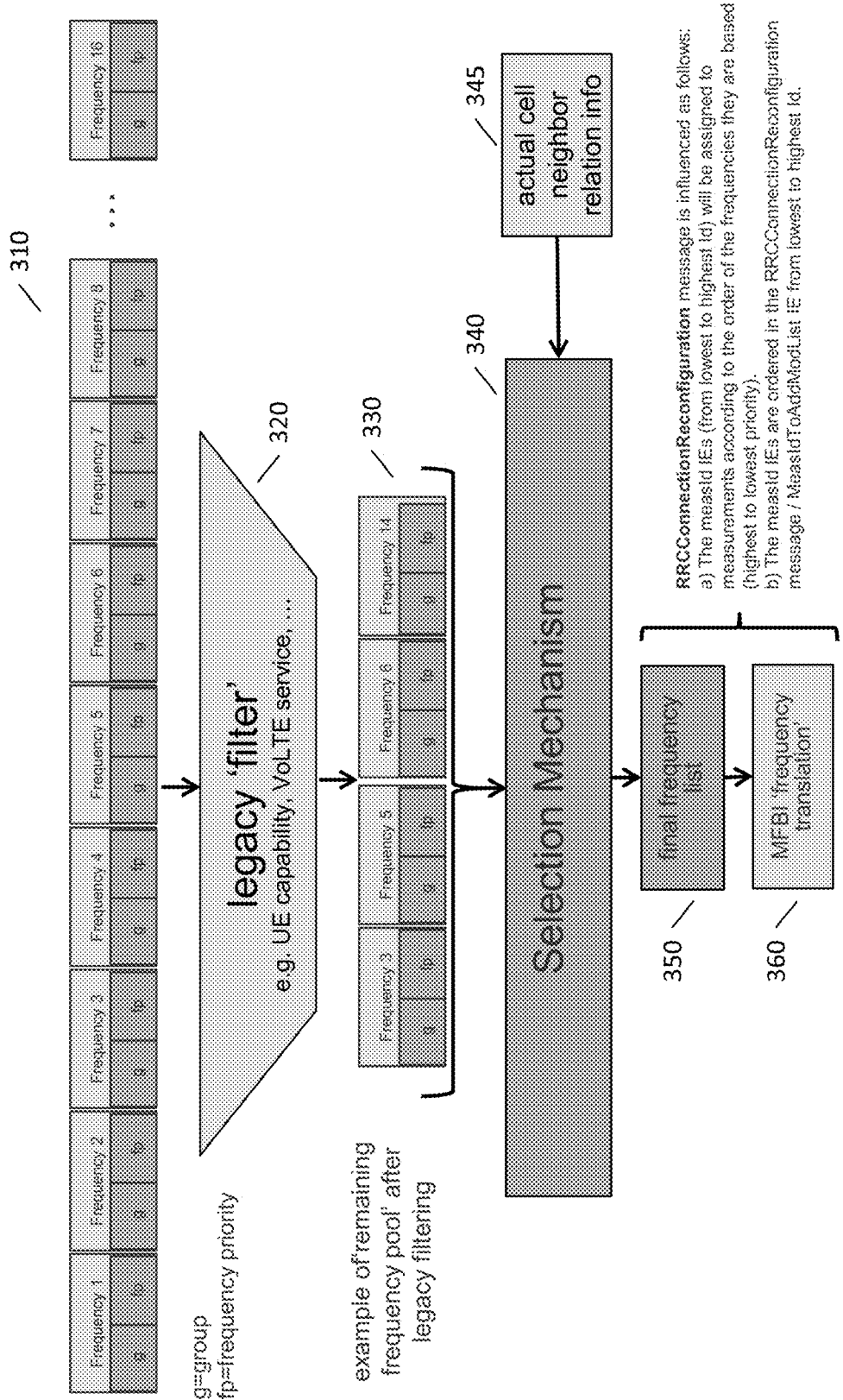
FIG. 3 illustrates the role of a selection mechanism according to certain embodiments in the context of other aspects of a communication system.

FIG. 3 illustrates the role of a selection mechanism according to certain embodiments in the context of other aspects of a communication system. As shown in FIG. 3, at 310 there can be a set of frequencies, the frequencies having a corresponding group and a corresponding frequency priority, which can be identified by configuring a group profile. Legacy filters 320, such as UE capability, or desired service support (such as voice over LTE (VoLTE) service), can reduce the frequency pool to a smaller number of frequencies 330. A selection mechanism 340 according to certain embodiments can then be applied to the set of frequencies 330 that correspond to a user equipment capability, desired service, or the like. The selection mechanism can take into account actual cell neighbor relation information 345. The output of the selection mechanism can be final frequency list 350, which can be provided in an RRC reconfiguration message. Frequency translation of the list, at 360, can be applied either before sending to the UE or at the UE itself. The frequency translation can use a multi-frequency band indicator (MFBI), as a frequency can have different ways of being indicated in different countries. For example, the frequency can be indicated as a combination of a frequency band an E-UTRA Absolute Radio Frequency Number (EARFCN), but different combinations of frequency band and EARFCN may be used in various places. Thus, translation can be used to provide a correctly understood combination of frequency band and EARFCN to identify the frequency. The measurement identification information elements (IEs) can be assigned to measurements according to the order of the frequencies that they are based on, for example from highest to lowest priority or vice versa.

If group share in the final list 350 provides more places as valid frequencies assigned to the group, the empty places can be filled with frequencies from other groups. This will be explained in more detail below.

Figure 4:
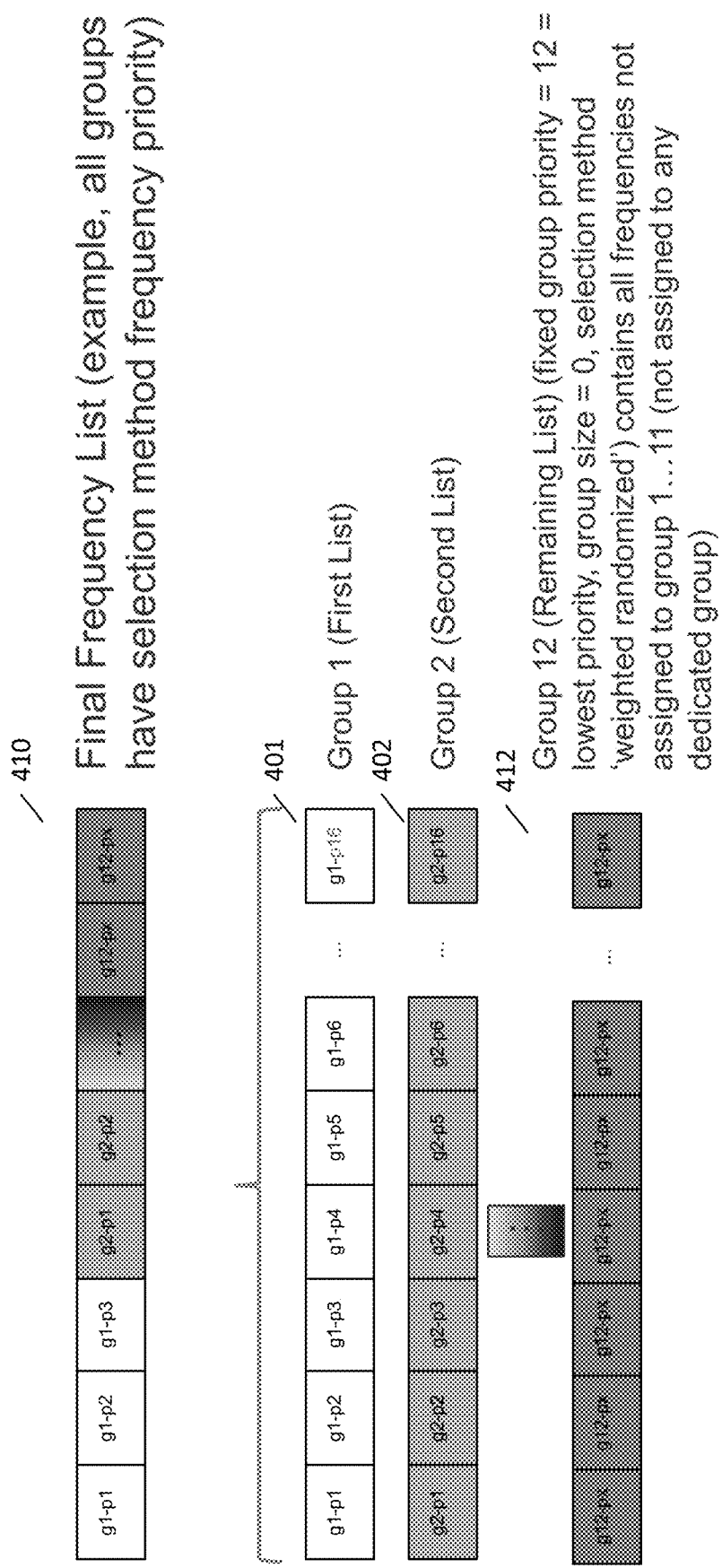
FIG. 4 illustrates a final frequency list construction according to certain embodiments.

FIG. 4 illustrates a final frequency list construction according to certain embodiments. As shown in FIG. 4, the final list 410 can include a plurality of frequencies from a plurality of groups. For example, frequencies in group 1 may be the frequencies from a first list 401, which is the one that may be most important. Within that list, various frequencies may be assigned various priorities. Similarly, group 2 may be a second list 402 and may similarly have frequencies having various priorities. Other groups, such as group 12, may be a remaining list 412, which may not have priorities within the group, for example if the selection mechanism for the group is randomized or weighted randomized. This randomized group may include all possible or available frequencies that are not part of a first list 401 or second list 402.

Figure 5:
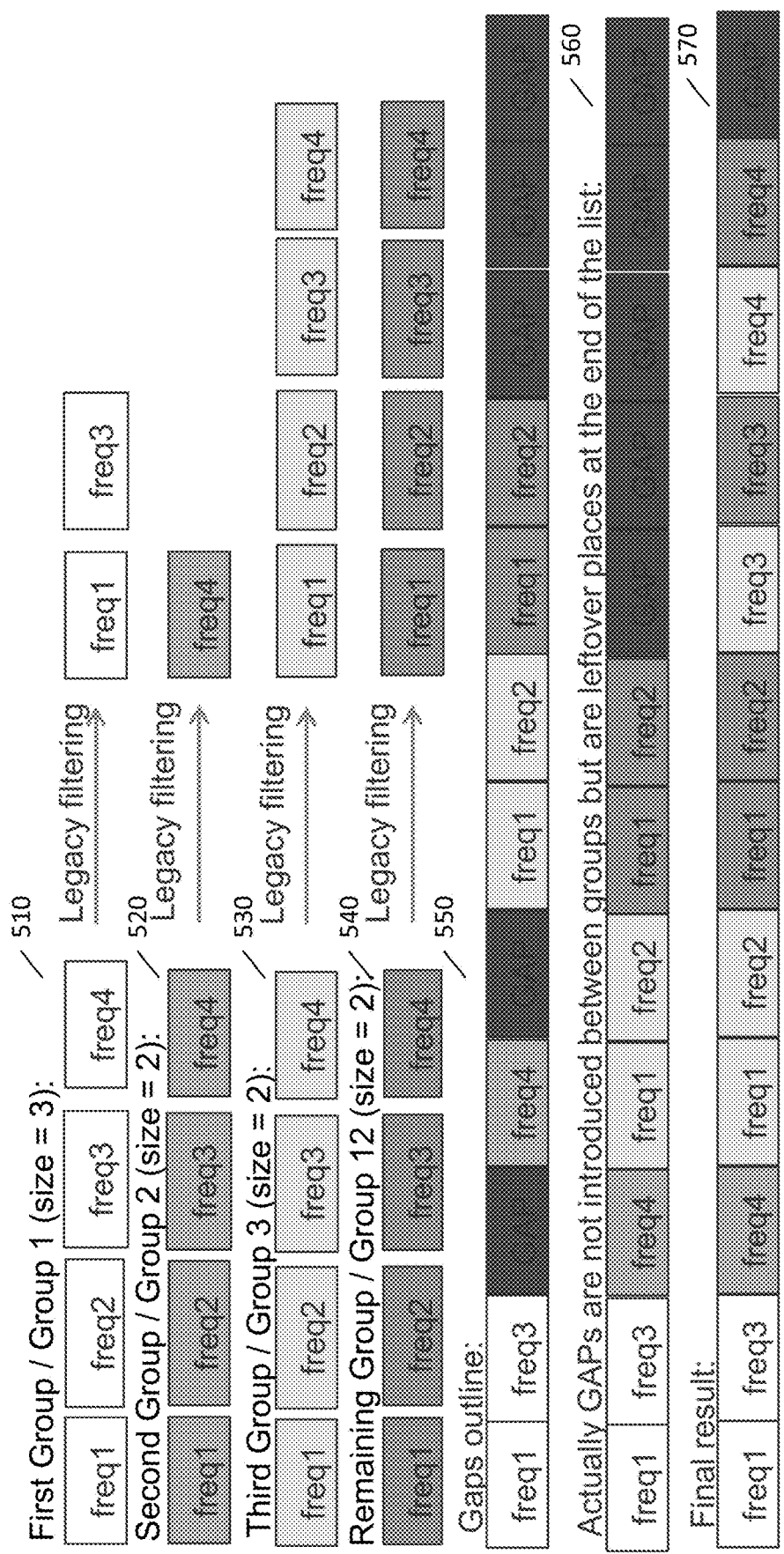
FIG. 5 illustrates filling up a final frequency list, according to certain embodiments.

FIG. 5 illustrates filling up a final frequency list, according to certain embodiments. As shown in FIG. 5, there can be a contribution of group n, having the lesser of the number of frequencies from group n after legacy filter, or a configured group n size. Frequencies from group n can then be directly followed by frequencies from group n+1, according to the group's respective contributions. If there is free space at the end of final frequency list after this filling mechanism, groups can, in a loop according to group priority, fill one place according to the respective group's method of selection, until there is no more space or frequencies left. As shown in this example, more than one pass through all groups may be needed.

Thus, as shown in FIG. 5, the first group 510, group 1, may have a size of three, a second group 520, group 2, may have a size of 2. A third group 530, group 3, may also have a size of 2, as may a remaining group 540, group 12. After the legacy filtering, there may only be two frequencies from the first list and one frequency from the second list, while the other two lists may have four frequencies per group. Thus, if gaps were supplied, the "gaps outline" line 550 would result. Instead, however, in certain embodiments, the n+1 group can immediately follow the last frequency of the preceding group.

After following the initial group size rules there may be gaps remaining as shown in line 560. These may be filled, as mentioned above, by passing through the groups again in order of priority and selecting one frequency from one group after another until all the gaps are filled or all frequencies are exhausted as shown in line 570. The latter case is shown in FIG. 5, in which one gap remains.

Figure 6:
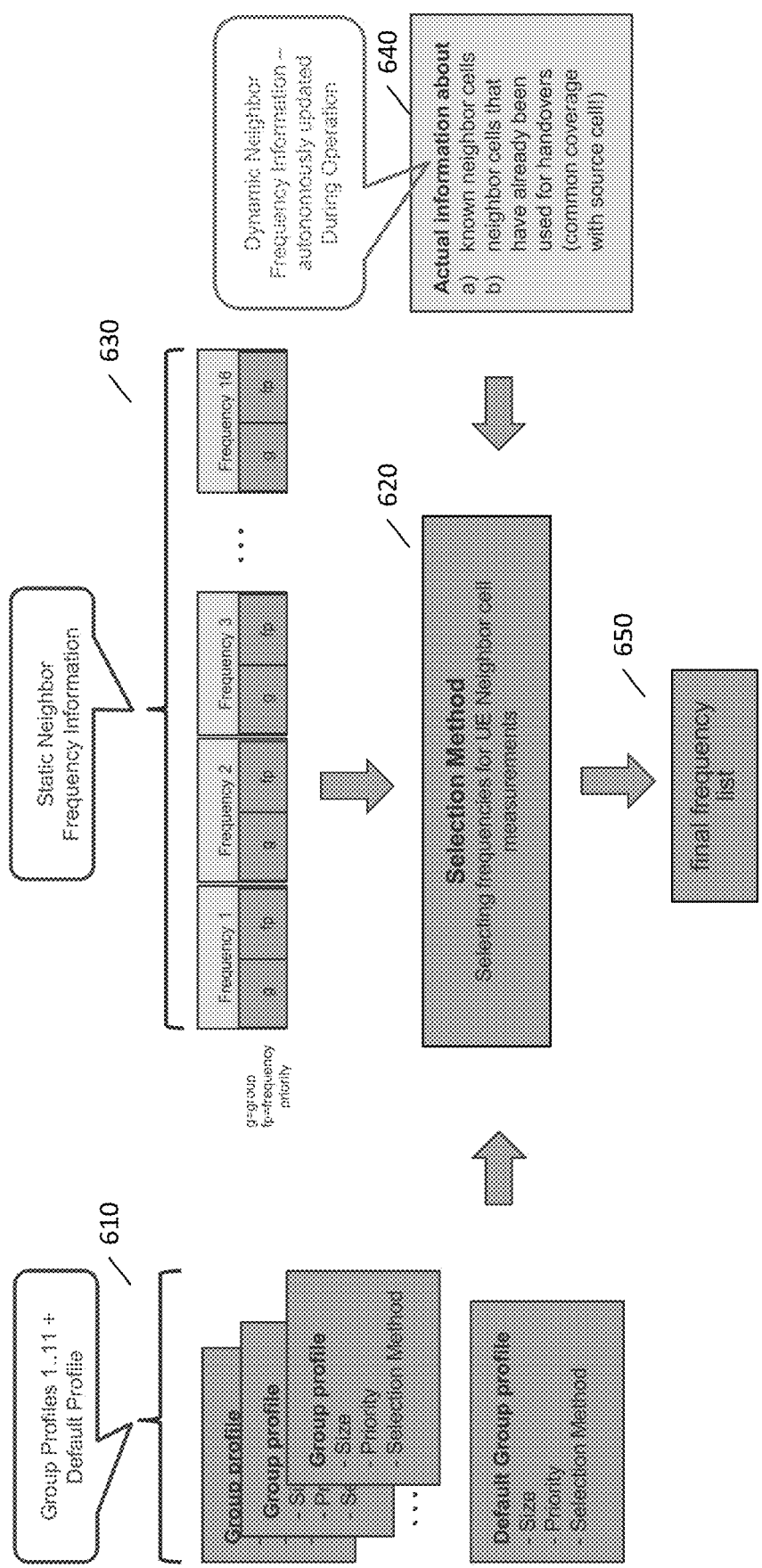
FIG. 6 illustrates a group selection mechanism, according to certain embodiments.

FIG. 6 illustrates a group selection mechanism, according to certain embodiments. As shown in FIG. 6, a group's characteristics can be set by the operator in the group's corresponding group profile 610. The group profile can include a variety of parameters. The parameter of group size can indicated a reserved number of frequencies of this group in the final frequency list, which may be for example, from 0 to 12. The use of zero can indicate that the group should only be used if there is leftover room after other groups have been included.

Another parameter can be group priority. This parameter can determine the group's position in the final frequency list, which can be from 1 to 12. As mentioned above, the default group can have priority 12, which can be the lowest group priority, with priority 1 being the first list or highest priority.

A further parameter can be a selection method. The selection method can be a rule of how to select frequencies of this group. The rule can be one of the following: fixed order within group; equal probability randomization; or weighted probability randomization. The weight, f, can be a function of historical information, such as number of times the frequency was recently measured, the number of times that such frequency measurement provided a useful result, the number of successful handovers to the frequency, the number of recent handovers from the frequency, or the like.

Default group 12 can have a default selection method of weighted probability randomization. This is one example. As mentioned above, the characteristics of a group profile including the default group profile can be operator configurable.

A selection method 620 at the eNB or other access device of a source cell may compare a set of static neighbor frequency information 630 to the group profiles 610. The selection method 620 may take into account dynamic neighbor frequency information 640. This information may be autonomously updated during operation and can include, for example, actual information about known neighbor cells and/or neighbor cells that have already been used for handovers, and which consequently may be assumed to have common coverage with the source cell. The output of selection method 620 may be final frequency list 650, as described herein.

Figure 7:
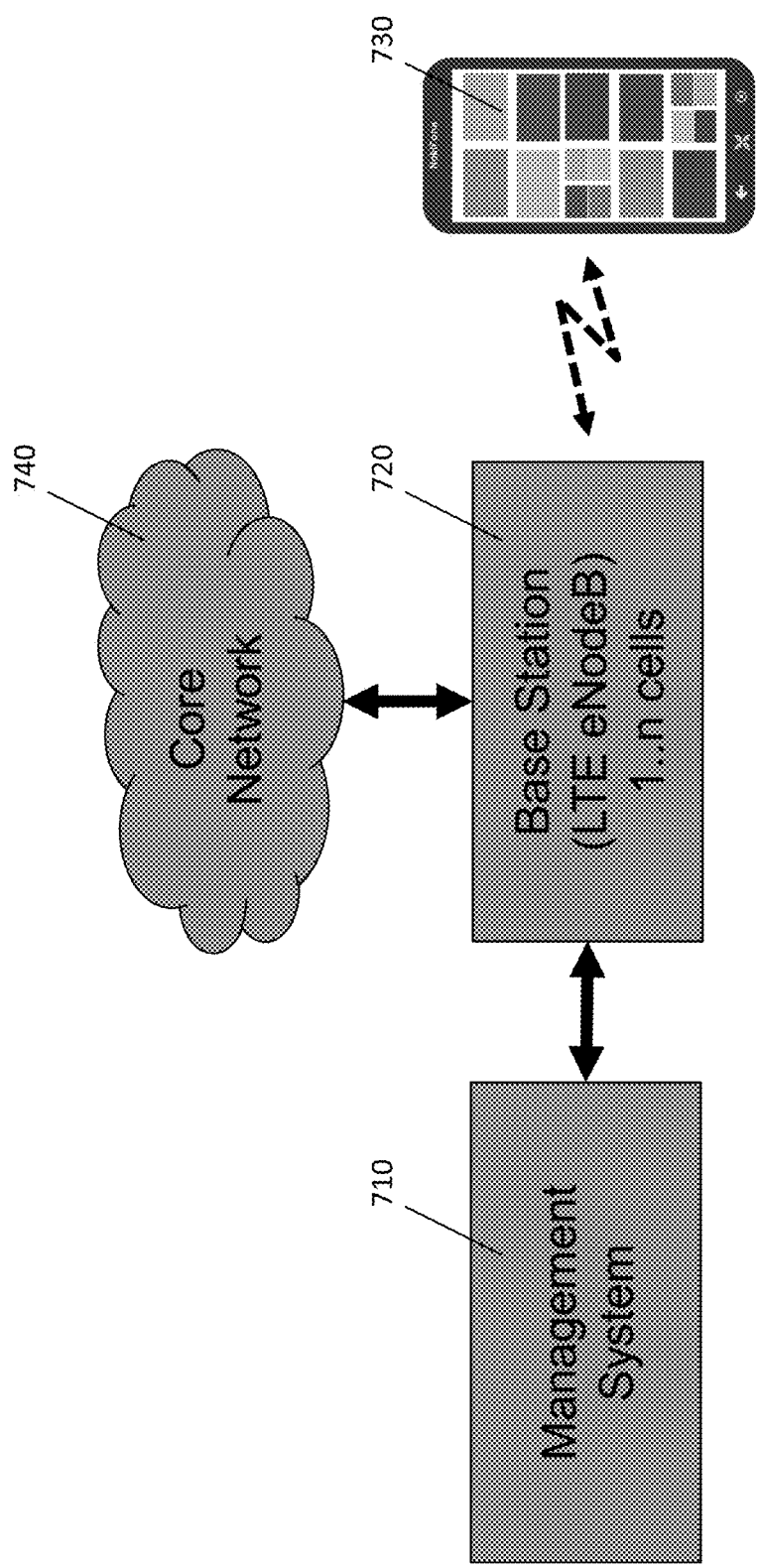
FIG. 7 illustrates a system according to certain embodiments.

FIG. 7 illustrates a system according to certain embodiments. The system can include a management system 710 and a base station 720, such as an LTE eNodeB include from 1 to n cells. The system can also include a user equipment 730, which can communicate with one of the cells of the base station 720 and may measure other cells of the base station 720 and other neighboring base stations. The system can also include core network 740. Although the management system 710 is shown connected to the base station 720 independently of the core network 740, it may alternatively be connected via the core network 740.

The selection mechanism described herein can run on the base station 720 or one or more of the cells thereof. The mechanism can be configured by the management system 720. The output of the mechanism can help to configure the user equipment 730 for inter frequency measurements.

Certain embodiments allow the operator to configure the eNodeBs or other access nodes on a cell level for efficiency and deployment-strategy-related selection of up to, for example, 12 target frequencies from a pool of up to, for example, 16 neighbor frequencies.

The feature can provide for more efficient handling of inter-frequency measurement configurations in networks with multiple LTE frequency layers with overlapping coverage.

Figure 8:
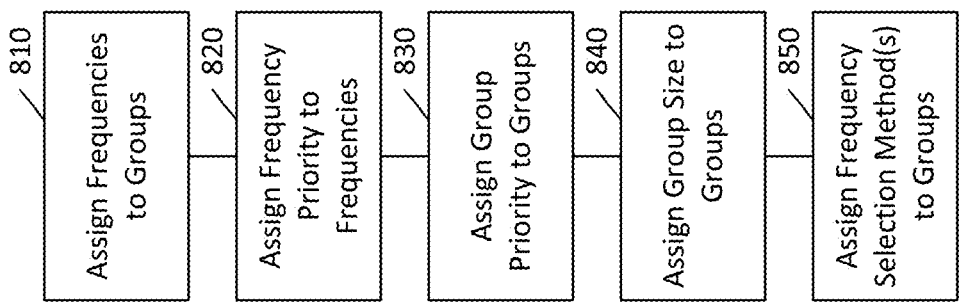
FIG. 8 illustrates another method according to certain embodiments.

FIG. 8 illustrates another method according to certain embodiments. The method can be performed by, for example, the management system 710 illustrates in FIG. 7.

As shown in FIG. 8, the operator can, at 810, assign frequencies to different frequency groups. The operator can also, at 820, assign a frequency priority, within the assigned group, to individual frequencies of the group.

The operator can further, at 830, assign a group priority to the defined groups. The group priority can determine the group order in the final frequency list The operator can additionally or alternatively, at 840, assign a group size to the defined group to reserve a certain number of places in the final frequency list for the related group's frequencies. The operator can further, at 850, assign a frequency selection method to the defined group(s). The assigned frequency selection method can define the way that frequencies are selected from the related group. The selection methods can include any of the following: fixed order within group; equal probability randomization; or weighted probability randomization.

With these configurations the operator can define the content of the final frequency list, which may be used for inter frequency measurement configuration. The configuration can be fully deterministic, meaning that it is fully operator controlled, in which all defined groups use frequency selection method of fixed order within group. Alternatively, the configuration can be mixed deterministic and statistical, in which there is a randomized frequency selection method. The configuration can be static, such as the equal probability randomization method, or dynamic, such as the weighted probability randomization method. The weight in the weighted method can be, for example, a function of the number of currently known neighbor cells per frequency.

The operator can implement the above in a variety of ways. For example, an operator can creates a delta configuration plan file with at least the following content using a network management system. The plan file can contain all configuration data for the eNodeB. The operator's parameter settings can be reflected in this file. The plan file can be sent from the management system to the eNodeB or other access device. At least one instance of a neighbor frequency can be created. Per neighbor frequency instance, a frequency group priority can be configured, which assigns related frequency to a specific group.

Per neighbor frequency instance, a frequency group priority can be configured, which assigns related frequency a priority within the assigned group. Moreover, per frequency group, a group profile can be created that contains group characteristics. The group characteristics can include group priority, group size, and frequency selection method.

Group priority can determines the group priority in final frequency list. This priority can have a fixed value of, for example, 12 in a default group profile. Group size can determine the foreseen number of frequencies of this group in the final frequency list, prior to gap filling.

Frequency selection method can determine the selection method of frequencies in final frequency list. As mentioned several times above, the method can include the following: fixed order within group, weighted probability randomization, and equal probability randomization.

The operator can download and activate the configuration plan file. The eNB can persistently store new and modified configuration data. Moreover, the eNB can inform the network management system about any changed configurations via configuration change notifications (CCNs). For example, the eNB may autonomously change the configuration, for example as a result of self-organizing network (SON) activities. As another example, load information exchange can lead to an autonomously adapted set of mobility parameters. These parameters may be adapted for the sake of load distribution or traffic steering. The adapted parameters can be provided to the management system. The eNB can take online configuration changes into account without a service outage, if only the above parameters are configured.

The eNB may take as its inputs to the selection mechanism operator configured parameters, including parameters related to frequency (group and frequency priority), group profiles (group priority, group size, selection method), and dynamic neighbor relation information per neighbor frequency. The dynamic neighbor relation information include a number of known neighbor cells and a number of neighbor cells that have been already used for handovers. The prefiltered frequency list that has been narrowed down by UE capabilities, service, and the like can also serve as an input.

As an output, the selection mechanism can produce a final frequency list according to static and dynamic conditions. This list can then be provided to a user equipment to guide its measurements.

Figure 9:
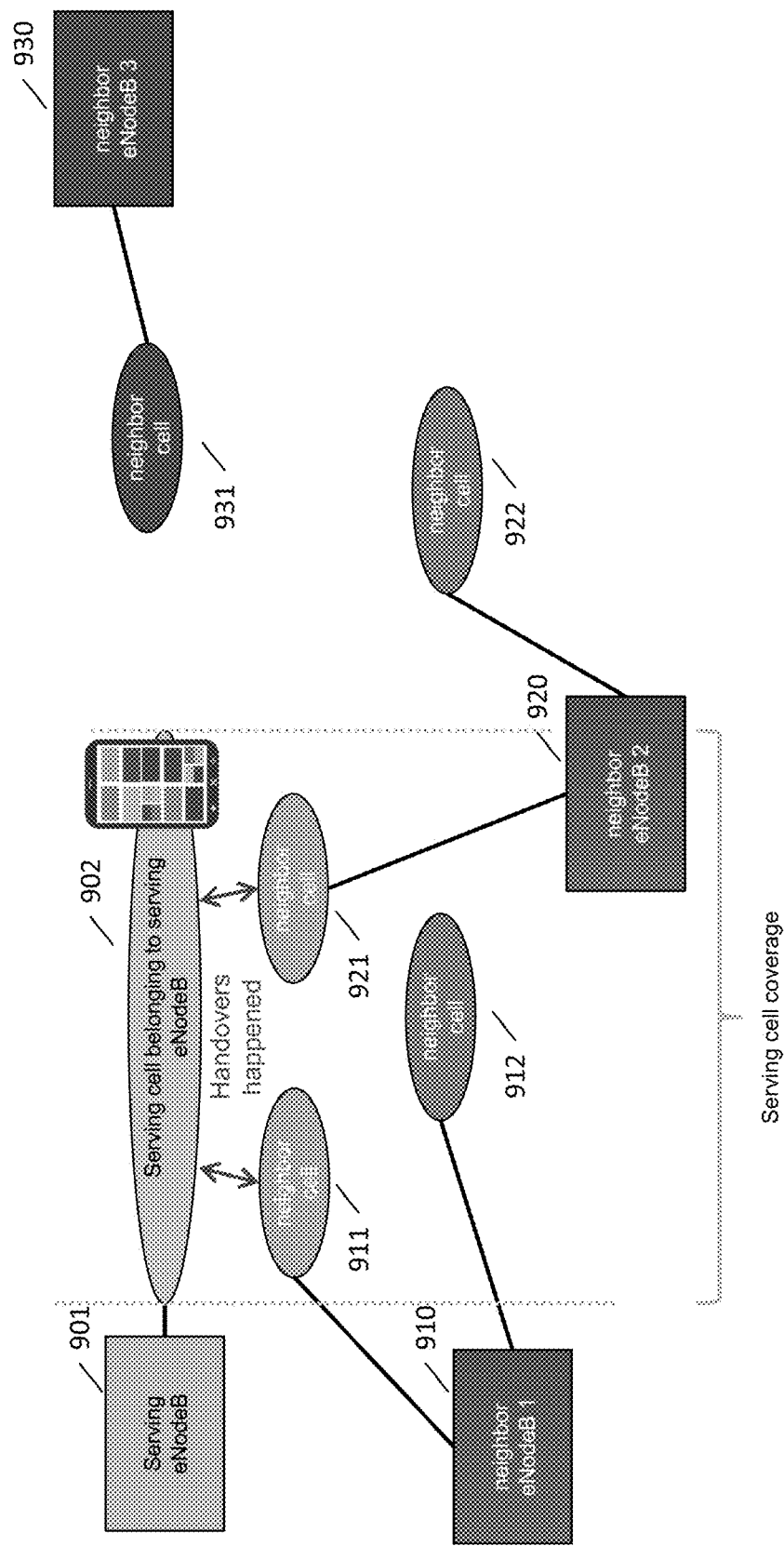
FIG. 9 illustrates weight probability randomization according to certain embodiments.

FIG. 9 illustrates weight probability randomization according to certain embodiments. As shown in FIG. 9, a serving eNode B 901 can operate a serving cell 902 on frequency f1. A neighbor eNode B 1, at 910, and another neighbor eNode B 2, at 920, can operate several cells, some closer operating at frequency f2, namely cells 911 and 921, and others farther, namely cells 912 and 922 (operating at frequency f3), from the serving cell 902. Meanwhile a neighbor eNodeB 3, at 930, can operate a neighbor cell 931 that is rather far (operating at frequency f4) from the serving cell. There can be an X2 I/F connection between all eNode Bs.

In this example, handovers (HOs) happened to frequency f2 cells of eNodeB 1 and eNodeB 2. After HO, related eNodeBs can exchange information about all their cells. Moreover, in this case, f2, f3 and f4 belong to same frequency group, with a selection method weighted probability randomization.

The serving eNodeB 901 knows the following things that are related to the serving cell 902: configured neighbor frequencies include f2, f3, and f4. In principle known neighbor cells from X2 information exchange can include the following: 2 cells at frequency 2, 2 cells at frequency 3, no cells at frequency 4. Handovers have, in this example, happened to two cells at frequency 2, no cells at frequency 3, and no cells at frequency 4.

In one example, the weight for frequency fx=1+1*(# of known fx-cells)+5*(# of fx-cells that have already been used for HO to/from serving cell).

In this case, cells that have already been used for HO can bring a big portion of weight to their frequency as they have proved common coverage with the serving cell. Other ways of weighting are also permitted. In this case, the outcome of such weighting is shown in FIG. 10.

FIG. 10 illustrates an example of a weighted probability randomization, according to certain embodiments. As shown in FIG. 10, on average, out of 18 frequency selections frequency f2 will be selected 13 times, frequency f3 will be selected 3 times, and frequency f4 will be selected 1 time.

Figure 11:
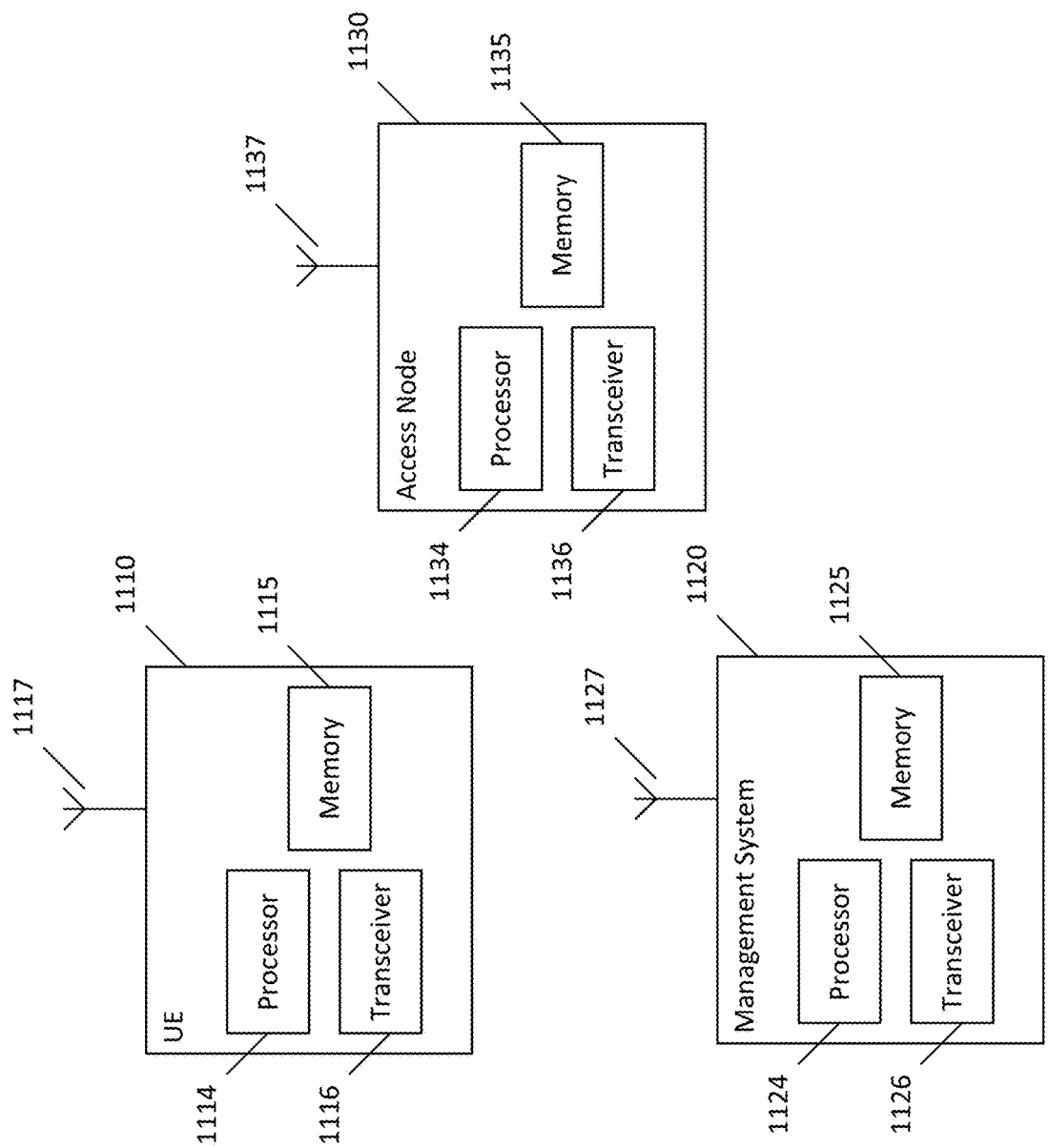
FIG. 11 illustrates a system according to certain embodiments.

FIG. 11 illustrates a system according to certain embodiments of the invention. In one embodiment, a system may include multiple devices, such as, for example, at least one UE 1110, at least one access node 1120, which may be an eNB, RACS, RNC, or other base station or access point, and at least one management system 1130 (e.g. Nokia NetAct), which may be a server or other computing system under the control of a network operator.

These devices may respectively include at least one processor, respectively indicated as 1114, 1124, and 1134. At least one memory can be provided in the devices, indicated as 1115, 1125, and 1135, respectively. The memory may include computer program instructions or computer code contained therein. The processors 1114, 1124, and 1134 and memories 1115, 1125, and 1135, or a subset thereof, can be configured to provide means corresponding to the various blocks of FIGS. 1, 2, and 8.

As shown in FIG. 11, transceivers 1116, 1126, and 1136 can be provided, and the devices may also include an antenna, respectively illustrated as 1117, 1127, and 1137. Other configurations of these devices, for example, may be provided. For example, management system 1130 may be configured for wired communication, instead of or in addition to wireless communication, and in such a case antenna 1137 can illustrate any form of communication hardware, without requiring a conventional antenna.

Transceivers 1116, 1126, and 1136 can, independently, be a transmitter, a receiver, or both a transmitter and a receiver, or a unit or device that is configured both for transmission and reception.

Processors 1114, 1124, and 1134 can be embodied by any computational or data processing device, such as a central processing unit (CPU), application specific integrated circuit (ASIC), or comparable device. The processors can be implemented as a single controller, or a plurality of controllers or processors.

Memories 1115, 1125, and 1135 can independently be any suitable storage device, such as a non-transitory computer-readable medium. A hard disk drive (HDD), random access memory (RAM), flash memory, or other suitable memory can be used. The memories can be combined on a single integrated circuit as the processor, or may be separate from the one or more processors. Furthermore, the computer program instructions stored in the memory and which may be processed by the processors can be any suitable form of computer program code, for example, a compiled or interpreted computer program written in any suitable programming language.

The memory and the computer program instructions can be configured, with the processor for the particular device, to cause a hardware apparatus such as UE 1110, access node 1120, and management system 1130, to perform any of the processes described herein (see, for example, FIGS. 1, 2, 8). Therefore, in certain embodiments, a non-transitory computer-readable medium can be encoded with computer instructions that, when executed in hardware, perform a process such as one of the processes described herein. Alternatively, certain embodiments of the invention can be performed entirely in hardware.

Furthermore, although FIG. 11 illustrates a system including a UE, access node, and management system, embodiments of the invention may be applicable to other configurations, and configurations involving additional elements. For example, not shown, additional UEs may be present, and additional core network elements may be present.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. A method implemented in a processor of an access node, comprising:
   identifying a set of possible frequencies for measurement by a user equipment in a mobile communication network;
   selecting a subset of frequencies from the possible frequencies based on parameters configured by a mobile network operator; and
   causing a communication of the selection to the user equipment in a list.

2. The method of claim 1, further comprising:
   receiving the parameters from a management system.

3. The method of claim 1, wherein the parameters comprise a group profile.

4. The method of claim 3, wherein the group profile comprises at least one of: a group priority, a group size and a frequency selection method.

5. The method of claim 4, wherein the group priority is configured to determine a position of a group of frequencies in the list relative to other groups of frequencies.

6. The method of claim 4, wherein the group size is configured to determine a number of reserved places for frequencies of a corresponding group.

7. The method of claim 4, wherein the frequency selection method is configured to determine how frequencies of a corresponding group are selected.

8. The method of claim 4, wherein the frequency selection method comprises at least one of fixed order within group, equal priority random selection, or weighted probability random selection.

9. An access node, comprising:
   at least one processor; and
   at least one memory including computer program code,
   wherein the at least one memory and the computer program code are configured to, with the at least one processor cause the access node at least to
   identify a set of possible frequencies for measurement by a user equipment in a mobile communication network;
   select a subset of frequencies from the possible frequencies based on parameters configured by a mobile network operator; and
   cause communication of the selection to the user equipment in a list.

10. The access node of claim 9, wherein the at least one memory and the computer program code are configured to, with the at least one processor cause the access node at least to receive the parameters from a management system.

11. The access node of claim 9, wherein the parameters comprise a group profile.

12. The access node of claim 11, wherein the group profile comprises at least one of: a group priority, a group size and a frequency selection method.

13. The access node of claim 12, wherein the group priority is configured to determine a position of a group of frequencies in the list relative to other groups of frequencies.

14. The access node of claim 12, wherein the group size is configured to determine a number of reserved places for frequencies of a corresponding group.

15. The access node of claim 12, wherein the frequency selection method is configured to determine how frequencies of a corresponding group are selected.

16. The access node of claim 12, wherein the frequency selection method comprises at least one of fixed order within group, equal priority random selection, or weighted probability random selection.

17. A management system, comprising:
   at least one processor; and
   at least one memory including computer program code,
   wherein the at least one memory and the computer program code are configured to, with the at least one processor cause the management system at least to
   group available frequencies for measurement by a user equipment in a mobile communication network into a plurality of groups; and
   configure parameters to an access node for selecting frequencies for measurement based on groups.

18. The management system of claim 17, wherein the parameters comprise at least one of group of a frequency, priority of a frequency, group priority, group size, or selection method.

19. The management system of claim 17, wherein the parameters form at least one group profile.

20. The management system of claim 19, wherein the group profile comprises at least one of: a group priority, a group size and a frequency selection method.

* * * * *